United States Patent
Fujimoto et al.

(10) Patent No.: US 7,151,128 B2
(45) Date of Patent: Dec. 19, 2006

(54) CURING COMPOSITION AND METHOD FOR APPLYING ALKYD COATING MATERIAL WITH THE SAME

(75) Inventors: Toyohisa Fujimoto, Kobe (JP); Ayako Yano, Kakogawa (JP); Toshifumi Hirose, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/478,324

(22) PCT Filed: May 31, 2002

(86) PCT No.: PCT/JP02/05332

§ 371 (c)(1),
(2), (4) Date: Nov. 20, 2003

(87) PCT Pub. No.: WO02/096988

PCT Pub. Date: Dec. 5, 2002

(65) Prior Publication Data

US 2004/0138398 A1    Jul. 15, 2004

(30) Foreign Application Priority Data

May 31, 2001 (JP) .............................. 2001-164259

(51) Int. Cl.
*C08F 283/06* (2006.01)
(52) U.S. Cl. .................... 524/404; 524/612; 427/385.5
(58) Field of Classification Search ................ 525/404; 524/612; 427/385.5
See application file for complete search history.

(56) References Cited

U.S. PATENT DOCUMENTS

| | | | | |
|---|---|---|---|---|
| 4,593,068 A | * | 6/1986 | Hirose et al. | ........ 525/100 |
| 4,965,311 A | * | 10/1990 | Hirose et al. | ........ 524/483 |
| 5,367,001 A | | 11/1994 | Itoh et al. | |
| 5,459,206 A | | 10/1995 | Somemiya et al. | |
| 6,410,676 B1 | * | 6/2002 | Yamasaki et al. | ........ 528/76 |

FOREIGN PATENT DOCUMENTS

| | | |
|---|---|---|
| EP | 0108946 A2 | 5/1984 |
| EP | 0265929 A2 | 5/1988 |
| EP | 0 324 156 A2 | 7/1989 |
| EP | 0324156 A2 | 7/1989 |
| EP | 0 327 017 A2 | 8/1989 |
| EP | 0 339 666 A2 | 11/1989 |
| EP | 0339666 A2 | 11/1989 |
| EP | 0 345 802 A2 | 12/1989 |
| EP | 0345802 A2 | 12/1989 |
| EP | 0496109 A2 | 7/1992 |
| EP | 0563894 A1 | 10/1993 |
| EP | 0775717 A2 | 5/1997 |
| JP | 05-065407 | 3/1993 |
| JP | 05-287189 | 11/1993 |
| JP | 08-253669 | 10/1996 |
| JP | 08-259795 | 10/1996 |
| JP | 2000129145 A2 | 5/2000 |

OTHER PUBLICATIONS

Safety data sheet from S-303.
Safety data sheet from SAT-010.
Extract relating to the term"BHT" from Rompp Chemie Lexikon, p. 536, vol. 1. A-C1. 1995 and Rompp online (2004).

* cited by examiner

*Primary Examiner*—Kuo-Liang Peng
(74) *Attorney, Agent, or Firm*—Kenyon & Kenyon LLP

(57) ABSTRACT

An object of the present invention is to improve a drying property of paint in application of alkyd paint to the surface of a cured material resulting from the curable composition containing an oxyalkylene polymer having at least one silicon-containing functional group capable of cross-linking by formation of at least one siloxane bond, and to provide a composition that contains an oxyalkylene polymer (A) having at least one silicon-containing functional group capable of cross-linking by formation of at least one siloxane bond and 2,6-di-t-butylhydroxytoluene wherein the content of the above-described 2,6-di-t-butylhydroxytoluene is 350 ppm or less relative to the above-described polymer (A).

10 Claims, No Drawings

CURING COMPOSITION AND METHOD FOR APPLYING ALKYD COATING MATERIAL WITH THE SAME

This is a 371 application of PCT/JP02/05332 filed on 31 May 2002, claiming priority to Japanese Application No. 2001-164259 filed on 31 May 2001, the entire contents of which are incorporated herein by reference.

TECHNICAL FIELD

The present invention relates to a curable composition containing an organic polymer having at least one silicon-containing functional group capable of cross-linking by formation of at least one siloxane bond and to a method for improving a drying property of paint by applying alkyd paint to the surface of a cured material of the curable composition.

BACKGROUND ART

Oxyalkylene polymers having at least one silicon-containing functional group capable of cross-linking by formation of at least one siloxane bond (hereafter may be referred to as polymer (A)) are proposed in each document of, for example, Japanese Examined Patent Application Publication Nos. 45-36319, 46-12154 and 49-32673, and Japanese Unexamined Patent Application Publication Nos. 50-156599, 51-73561, 54-6096, 55-82123, 55-123620, 55-125121, 55-131022, 55-135135, 55-137129, 3-72527, 11-60723 and 11-60724, and can be used in sealants, adhesives and the like.

However, when alkyd paint is applied to a cured material of a composition containing an oxyalkylene polymer having at least one silicon-containing functional group capable of cross-linking by formation of at least one siloxane bond, problems may occur in that the drying property (curability) of the coating is poor and, therefore, the application of the paint to the above-described cured material is practically difficult.

Examples of methods proposed for improving the drying property of the alkyd paint include a method in which a high molecular weight plasticizer is used, as shown in Japanese Unexamined Patent Application Publication No. 5-287189, and a method in which an unsaturated compound capable of reacting with oxygen in air is added, as shown in Japanese Unexamined Patent Application Publication No. 5-65407. However, these methods are not always satisfying.

SUMMARY OF THE INVENTION

An object of the present invention is to provide a curable composition having an improved drying property in application of an alkyd paint onto the curable composition containing a polymer (A) or a mixture of the polymer (A) and a polymer (B) having a molecular chain composed of (meth)acrylate monomer units and having at least one silicon-containing functional group capable of cross-linking by formation of at least one siloxane bond (hereafter may be referred to as a polymer (B)), and a method for improving a drying property of paint in application of the alkyd paint.

The inventors of the present invention conducted intensive research on causes of degradation of the drying property of the alkyd paint. As a result, it was found out that trace amounts of BHT included during the preparation process of the polymer (A) significantly degraded the drying property of the alkyd paint, and it was found out that the drying property of the alkyd paint was able to be very excellently improved by controlling the amount of BHT in the polymer (A) during the preparation, so that the present invention was made.

A first aspect of the present invention relates to a composition containing an oxyalkylene polymer (A) having at least one silicon-containing functional group capable of cross-linking by formation of at least one siloxane bond and 2,6-di-t-butylhydroxytoluene, wherein the content of the above-described 2,6-di-t-butylhydroxytoluene is 350 ppm or less relative to the above-described polymer (A).

A second aspect of the present invention relates to a composition containing an oxyalkylene polymer (A) having at least one silicon-containing functional group capable of cross-linking by formation of at least one siloxane bond, a polymer (B) having a molecular chain composed of (meth) acrylate monomer units and having at least one silicon-containing functional group capable of cross-linking by formation of at least one siloxane bond, and 2,6-di-t-butylhydroxytoluene, wherein the content of the above-described 2,6-di-t-butylhydroxytoluene is 350 ppm or less relative to the total amount of the above-described polymer (A) and the above-described polymer (B).

A third aspect of the present invention relates to an application method including the step of applying alkyd paint to the surface of a cured material resulting from the composition according to the first or the second aspect of the present invention.

A fourth aspect of the present invention relates to a method for improving a drying property of alkyd paint in application of the alkyd paint to the surface of a cured material resulting from a composition containing an oxyalkylene polymer (A) having at least one silicon-containing functional group capable of cross-linking by formation of at least one siloxane bond and 2,6-di-t-butylhydroxytoluene, the method including the step of adjusting the content of the above-described 2,6-di-t-butylhydroxytoluene at 350 ppm or less relative to the above-described polymer (A).

A fifth aspect of the present invention relates to a method for improving a drying property of alkyd paint in application of the alkyd paint to the surface of a cured material resulting from a composition containing an oxyalkylene polymer (A) having at least one silicon-containing functional group capable of cross-linking by formation of at least one siloxane bond, a polymer (B) having a molecular chain composed of (meth)acrylate monomer units and having at least one silicon-containing functional group capable of cross-linking by formation of at least one siloxane bond, and 2,6-di-t-butylhydroxytoluene, the method including the step of adjusting the content of the above-described 2,6-di-t-butylhydroxytoluene at 350 ppm or less relative to the total amount of the above-described polymer (A) and the above-described polymer (B).

The compositions according to the first and forth aspects of the present invention do not contain the polymer (B).

DISCLOSURE OF INVENTION

The present invention will be described below in detail.
Preferably, the molecular chain of the oxyalkylene polymer (A) used in the present invention essentially has a repeating unit represented by general formula (1):

(In the formula, $R^1$ represents a divalent organic group. In particular, a divalent hydrocarbon group having a carbon number of 2 to 20 is preferable, and a divalent hydrocarbon group having a carbon number of 2 to 10 is more preferable. Most preferably, most of the divalent hydrocarbon groups, each represented by $R^1$, have a carbon number of 3 or 4.).

Specific examples of $R^1$ include —CH(CH$_3$)CH$_2$—, —(C$_2$H$_5$)CH$_2$—, —C(CH$_3$)$_2$CH$_2$—, —CH$_2$CH$_2$CH$_2$—, —CH$_2$CH$_2$CH$_2$CH$_2$— and the like. The molecular chain of the above-described oxyalkylene polymer may be composed of simply one type of repeating unit, or be composed of at least two types of repeating unit. $R^1$ is preferably —CH(CH$_3$)CH$_2$—. The polymer may be a homopolymer in which all of the repeating units are the same, or be a copolymer including at least two types of repeating unit. The main chain may include a branched structure.

In order to prepare the molecular chain of the oxyalkylene polymer, polyethers can be used. The polyethers can be prepared by ring-opening polymerization of a substituted or unsubstituted epoxy having a carbon number of 2 to 12 with various oligomers having dihydric or polyhydric alcohol and hydroxyl groups as initiators in the presence of various catalysts. Examples of epoxies include alkylene oxides, specifically, ethylene oxide, propylene oxide, α-butylene oxide, β-butylene oxide, hexene oxide, cyclohexene oxide, styrene oxide, and α-methylstyrene oxide; and alkyl, allyl or aryl glycidyl ethers, specifically, methyl glycidyl ether, ethyl glycidyl ether, isopropyl glycidyl ether, butyl glycidyl ether, allyl glycidyl ether, and phenyl glycidyl ether. Examples of oligomers include ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylene triol, polypropylene tetraol, dipropylene glycol, glycerin, trimethylolmethane, trimethylolpropane and pentaerythritol. Catalysts used for this polymerization are already known catalysts, for example, alkaline catalysts, e.g., KOH and NaOH; acidic catalysts, e.g., trifluoroborane-etherate; composite metal cyanide complex catalysts, e.g., aluminoporphyrin metal complexes and zinc cobalt cyanide-glyme complex catalyst; phosphazene catalysts (PZN) which are non-metallic molecular catalysts; and cesium catalysts. In particular, composite metal cyanide complex catalysts which cause few side reactions and phosphazene catalysts (PZN) which are non-metallic molecular catalysts are preferably used because of a reduced content of low molecular weight polyether components which can readily transfer to the paint.

Examples of those having a molecular chain of an oxyalkylene polymer and having hydroxyl groups at terminals include those described in, for example, Japanese Unexamined Patent Application Publication Nos. 46-27250, 50-149797 and 61-197631, Japanese Examined Patent Application Publication No. 59-15336, and Japanese Unexamined Patent Application Publication Nos. 2-276821, 10-273512 and 11-106500.

In addition to these, the main chain skeleton of the oxyalkylene polymer can be achieved through chain extension and the like of hydroxyl-terminated polyether oligomers with halogenated alkyls of at least di-functional, for example, CH$_2$Cl$_2$ and CH$_2$Br$_2$, in the presence of a basic compound, for example, KOH, NaOH, KOCH$_3$ and NaOCH$_3$.

The silicon-containing functional group capable of cross-linking by formation of a siloxane bond (hereafter may be referred to as reactive silicon functional group) in the present invention is a well-known functional group, and can cross-link even at room temperature. Typical examples of the reactive silicon functional groups are represented by general formula (2):

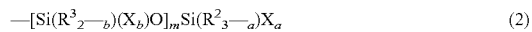

(In the formula, $R^2$ or $R^3$ represents a substituted or unsubstituted monovalent organic group (preferably, a hydrocarbon group) having a carbon number of 1 to 20 or a triorganosiloxy group. X represents a hydroxyl group or a hydrolyzable group, and when the number of X is at least two, those may be the same or be different. Subscript a represents 1, 2 or 3, and subscript b represents 0, 1 or 2. Subscript b may be the same or be different in the groups —(Si(R$^3_2$—$_b$)(X$_b$)O)— (the number is m). Subscript m represents an integer of 0 to 19. In addition, a+Σb≧1 is satisfied.).

From the viewpoint of economy and the like, the reactive silicon functional group is preferably represented by general formula (3):

(In the formula, $R^2$ and X are the same as those described above. Subscript a represents 1, 2 or 3.).

More preferably, $R^2$ is a methyl group, X is a methoxy group, and subscript a is 2 or 3.

Preferably, the number of the reactive silicon functional group in the polymer (A) is one or more, more preferably, is 1.1 or more and, most preferably, is 1.5 or more from the viewpoint of sufficient curability. Preferably, the apparent number average molecular weight is 1,000 to 15,000 per reactive silicon functional group present therein.

Specific examples of hydrolyzable groups in general formula (2) include a halogen atom, a hydrogen atom, an alkoxy group, an acyloxy group, a ketoximate group, an amino group, an amide group, an aminooxy group, a mercapto group, an alkenyloxy group and the like. Among these, alkoxy groups, such as a methoxy group and an ethoxy group are preferable. Specific examples of $R^2$ in the general formula (2) include alkyl groups, e.g., a methyl group and an ethyl group; cycloalkyl groups, e.g., a cyclohexyl group; aryl groups, e.g., a phenyl group; and aralkyl groups, e.g., a benzyl group. Furthermore, $R^2$ may be a triorganosiloxy group represented by general formula (4):

($R^{20}$ represents a substituted or unsubstituted monovalent organic group (preferably, a hydrocarbon group) having a carbon number of 1 to 20). Among these, a methyl group is particularly preferable.

Preferably, the number average molecular weight of the oxyalkylene polymer (A) is 1,000 to 50,000 and, more preferably, is 3,000 to 25,000. Preferably, the molecular weight distribution measured with a gel permeation chromatograph is 2.0 or less and, more preferably, is 1.5 or less. It is particularly preferable that the number average molecular weight is 10,000 or more and the molecular weight distribution measured with the gel permeation chromatograph is 1.5 or less because of a reduced content of low molecular weight polyether components which can readily transfer to the paint. The oxyalkylene polymer (A) may be used alone or in combination.

Examples of oxyalkylene polymers (A) used in the present invention include a polymer prepared by an addition reaction of a hydrogenated silicon compound represented by general formula (5):

$$H\text{—}Si(R^2{}_{3-a})X_a \quad (5)$$

(In the formula, $R^2$ and X are the same as those described above. Subscript a represents 1, 2 or 3.) and a polyether having an olefin group represented by general formula (6)

$$HC(R^4)\text{=}CH\text{—}R^5\text{—}O\text{—} \quad (6)$$

(In the formula, $R^4$ represents a hydrogen atom or a monovalent organic group having a carbon number of 1 to 20, and $R^5$ represents a divalent organic group (preferably, a hydrocarbon group) having a carbon number of 1 to 20.) while a group VIII transition metal catalyst, e.g., a platinum compound, serves as a catalyst.

Specific examples of methods for manufacturing an alkylene oxide polymer having an olefin group represented by general formula (6) may be methods disclosed in Japanese Unexamined Patent Application Publication No. 54-6097 and Japanese Unexamined Patent Application Publication No. 3-72727, or a method in which an olefin-containing-epoxy compound, e.g., allyl glycidyl ether, is added in polymerization of an epoxy compound, e.g., ethylene oxide and propylene oxide, and thereby, an olefin group is introduced in a side chain due to copolymerization.

Examples of oxyalkylene polymers having unsaturated groups at terminals include those manufactured by methods disclosed in Japanese Unexamined Patent Application Publication Nos. 50-149797 and 61-215623, Japanese Examined Patent Application Publication No. 61-29371, Japanese Unexamined Patent Application Publication Nos. 1-294733, 5-97996, 8-231707 and 11-106500 and the like.

Examples of transition metal complex catalysts effectively used for the above-described addition reaction include complex compounds of group VIII transition metals selected from the group consisting of platinum, rhodium, cobalt, palladium and nickel. In particular, platinum-based compounds, e.g., platinum black, chloroplatinic acid, a platinum alcohol compound, a platinum olefin complex, a platinum aldehyde complex, and a platinum ketone complex, are effective.

Specific examples of methods other than the above-described methods for manufacturing the oxyalkylene polymer (A) include:

(a) a method in which a hydroxyl-terminated polyoxyalkylene is allowed to react with a polyisocyanate compound, e.g., toluene diisocyanate, to prepare an isocyanate-terminated alkylene oxide polymer and, subsequently, the resulting isocyanate group is allowed to react with a W group of a silicon compound represented by general formula (7):

$$W\text{—}R^5\text{—}Si(R^2{}_{3-a})X_a \quad (7)$$

(In the formula, W represents an active hydrogen-containing group selected from the group consisting of a hydroxyl group, a carboxyl group, a mercapto group and a (primary or secondary) amino group, and $R^2$, $R^5$ and X are the same as those described above. Subscript a represents 1, 2 or 3.);

(b) a method in which a mercapto group of a silicon compound represented by the general formula (7) where W is a mercapto group is subjected to an addition reaction with the olefin group of the polyoxyalkylene having an olefin group represented by general formula (6); and (c) a method in which a hydroxyl group of a hydroxyl-terminated polyoxyalkylene is allowed to react with a compound represented by general formula (8):

$$NCO\text{—}R^5\text{—}Si(R^2{}_{3-a})X_a \quad (8)$$

(In the formula, $R^2$, $R^5$ and X are the same as those described above. Subscript a represents 1, 2 or 3.). However, the present invention is not limited to these above-described methods.

The polymer (B), used in the present invention, having a molecular chain composed of (meth)acrylate monomer units and having at least one silicon-containing functional group capable of cross-linking by formation of at least one siloxane bond is described in each of Japanese Unexamined Patent Application Publication Nos. 59-78223, 59-168014, 60-31556, 60-228516, 60-228517, 63-112642 and the like. In particular, this polymer is useful for a composition with the oxyalkylene polymer (A).

Preferably, the (meth)acrylate monomer used in the present invention is a monomer represented by general formula (9).

$$CH_2\text{=}C(R^6)(COOR^7) \quad (9)$$

(In the formula, $R^6$ represents a hydrogen atom or a methyl group, and $R^7$ represents a substituted or unsubstituted monovalent hydrocarbon group (preferably, the number of carbons is 1 to 25).)

Examples of $R^7$ in the above-described general formula (9) include alkyl groups having a carbon number of 1 to 8, e.g., a methyl group, an ethyl group, a propyl group, a n-butyl group, a t-butyl group, and a 2-ethylhexyl group; long-chain alkyl groups having a carbon number of 10 or more, e.g., a lauryl group, a tridecyl group, a cetyl group, a stearyl group, an alkyl group having a carbon number of 22, and a biphenyl group; and substituted hydrocarbon groups, e.g., a glycidyl group, an aminoethyl group, and a diethylaminoethyl group.

These may be used alone or in combination.

The polymer (B) may include units originating from monomers other than the (meth)acrylate monomer. Preferably, the content of the units originating from the (meth)acrylate monomer in the polymer (B) is 50 percent by weight or more and, more preferably, is 70 percent by weight or more in point of compatibility.

More preferably, a mixture of a monomer represented by general formula (10) and a monomer represented by general formula (11) is used as the (meth)acrylate monomer in the polymer (B) because of improvement in the compatibility with the polymer (A)

$$CH_2\text{=}C(R^6)(COOR^8) \quad (10)$$

(In the formula, $R^6$ is the same as that described above, and $R^8$ represents an alkyl group having a carbon number of 1 to 8.)

$$CH_2\text{=}C(R^6)(COOR^9) \quad (11)$$

(In the formula, $R^6$ is the same as that described above, and $R^9$ represents an alkyl group having a carbon number of at least 10.)

Preferably, the total content of the monomer units originating from the monomer represented by general formula (10) and the monomer units originating from the monomer represented by general formula (11) in the polymer (B) is 50 percent by weight or more and, more preferably, is 70 percent by weight or more. Preferably, the ratio of the units originating from the monomer represented by general formula (10) to the units originating from the monomer represented by general formula (11) in the polymer (B) is 95:5 to 40:60 in terms of weight ratio and, more preferably, is 90:10 to 60:40.

Examples of monomers other than the (meth)acrylate monomer include acrylic acids, e.g., acrylic acid and methacrylic acid; amides, e.g., acrylamide, methacrylamide, N-methylol acrylamide, and N-methylol methacrylamide; epoxies, e.g., glycidyl acrylate, and glycidyl methacrylate; amino group-containing monomers, e.g., diethylaminoethyl acrylate, diethylaminoethyl methacrylate, and aminoethyl vinyl ether; and other monomers, e.g., acrylonitrile, iminol methacrylate, styrene, α-methylstyrene, alkyl vinyl ether, vinyl chloride, vinyl acetate, vinyl propionate, ethylene and the like.

Preferably, the number average molecular weight of the polymer (B) is 500 to 100,000 in point of ease of handling.

The reactive silicon functional group in the oxyalkylene polymer (B) is the same as that described above.

The reactive silicon functional group may be introduced into the polymer (B) by any method. Examples of the methods include:

(a) a method in which a compound (for example, 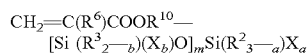 having a polymerizable unsaturated bond and a reactive silicon functional group is added to a monomer represented by general formula (9), followed by copolymerization; and (b) a method in which a compound having a polymerizable unsaturated bond and a reactive silicon functional group (hereafter referred to as Y group) (for example, acrylic acid) is added to a monomer represented by general formula (9), followed by copolymerization and, subsequently, the resulting copolymer is allowed to react with a compound having a reactive silicon group and a functional group (for example, a compound having an isocyanate group and a —Si(OCH$_3$)$_3$ group) capable of reacting with the Y group (hereafter referred to as Y' functional group).

The above-described compound having a polymerizable unsaturated bond and a reactive silicon functional group includes a compound represented by general formula (12):

$$CH_2=C(R^6)COOR^{10}—[Si\ (R^3{}_{2-b})(X_b)O]_mSi(R^2{}_{3-a})X_a$$

(In the formula, $R^6$ is the same as that described above. $R^{10}$ represents a divalent alkylene group having a carbon number of 1 to 10. $R^2$, $R^3$, X, a, b, and m are the same as those described above.) or general formula (13):

(In the formula, $R^2$, $R^3$, $R^6$, X, a, b, and m are the same as those described above.).

Specific examples of compounds represented by general formula (12) or (13) are as follows:

γ-methacryloxypropylalkyl polyalkoxysilanes, e.g., γ-methacryloxypropyltrimethoxysilane, γ-methacryloxypropylmethyldimethoxysilane and γ-methacryloxypropyltriethoxysilane; γ-acryloxypropylalkyl polyalkoxysilanes, e.g., γ-acryloxypropyltrimethoxysilane, γ-acryloxypropylmethyldimethoxysilane and γ-acryloxypropyltriethoxysilane; and vinyl alkyl polyalkoxysilanes, e.g., vinyl trimethoxysilane, vinyl methyldimethoxysilane, and vinyl triethoxysilane.

These silane compounds may be synthesized by any method. For example, these can be prepared by allowing acetylene, allylacrylate, allylmethacrylate, diallylphthalate, and the like to react with methyldimethoxysilane, methyldichlorosilane, and the like in the presence of a catalysis of a group VIII transition metal.

The polymer (B) of the present invention can be prepared by polymerizing the monomer represented by general formula (9) through vinyl polymerization, for example, vinyl polymerization based on a radical reaction by an ordinary solution polymerization method, a block polymerization method and the like.

The above-described monomer, a radical initiator and the like, if necessary, and a chain transfer agent, e.g., n-dodecyl mercaptan and t-dodecyl mercaptan for preparing the polymer (B) preferably having a number average molecular weight of 500 to 100,000 are mixed, followed by reacting at 50° C. to 150° C. Preferably, a solvent is a non-reactive solvent, for example, alcohol, ether, aliphatic or aromatic hydrocarbon, acetate or ketone.

Desirably, the solvent is removed by vaporization and the like after the reaction is completed. When an aromatic compound is used as hydrocarbon, preferably, the aromatic compound remaining in the polymer (B) is reduced as much as possible.

With respect to the ratio of the oxyalkylene polymer (A) to the polymer (B) in the composition of the present invention, preferably, the amount of the polymer (B) is within the range of 5 to 5,000 parts by weight relative to 100 parts by weight of the oxyalkylene polymer (A) because the characteristics of each of the polymers (A) and (B) are significantly improved and, more preferably, is within the range of 5 to 2,000 parts by weight. In general, the ratio is selected in accordance with the use and performance. For example, with respect to the use as a sealant, the range is generally in the range of 10 to 45 parts by weight.

The composition containing the polymer (A) and the polymer (B) of the present invention is prepared by separately manufacturing the oxyalkylene polymer (A) and the polymer (B), and by mixing them. However, the composition can also be prepared by polymerizing the (meth)acrylate monomer in the presence of the oxyalkylene polymer (A).

Since the oxyalkylene polymer (A) used in the present invention is readily degraded due to oxidization, an antioxidant is added for stabilization of the monomer before polymerization and during the preparation of the polymer, and for preservation of the resulting polymer.

In particular, significantly large amounts of antioxidant is used in the preparation process of the oxyalkylene polymer (A) having a reactive group in order to prevent degradation due to oxidization during the reaction, e.g., a terminal etherification reaction under a highly alkaline condition.

With respect to the preparation of the oxyalkylene polymer having reactive groups, since an antioxidant is contained in order to prevent degradation due to oxidization of the oxyalkylene-based compound as a raw material therefor, the preparation by polymerization may be performed without further addition of the antioxidant if extreme caution is taken. However, this operation requires much expense in time and effort and extreme caution. Therefore, industrially, the antioxidant is added particularly from the viewpoint of simplification of the process and the variations in the product characteristics.

Various compounds are commercially available as such an antioxidant. However, 2,6-di-t-butylhydroxytoluene (may be referred to as "BHT" in the present specification) is commonly used from the viewpoint of inexpensiveness and ease of handling. The present invention is based on the findings concerning the improvement in ease of application of the alkyd paint when the content of BHT in the composition containing the oxyalkylene polymer (A) having at least one silicon-containing functional group capable of cross-linking by formation of at least one siloxane bond is within the range of 350 ppm or less relative to the oxyalkylene polymer. Furthermore, in the case of the composition containing the oxyalkylene polymer (A) having at least one silicon-containing functional group capable of cross-linking by formation of at least one siloxane bond and the polymer (B) having a molecular chain composed of (meth)acrylate monomer units and having at least one silicon-containing functional group capable of cross-linking by formation of at least one siloxane bond, it was found out that ease of application of the alkyd paint was improved when the content of BHT was within the range of 350 ppm or less relative to the total amount of the polymer (A) and the polymer (B).

Preferably, the amount of BHT is in the range of 1 ppm to 350 ppm relative to the amount of the polymer (A) alone or the total amount of the polymer (A) and the polymer (B). The lower limit of the amount of BHT is preferably 2 ppm, and the upper limit of the amount of BHT is preferably 300 ppm. If the content of BHT is less than this, degradation due to oxidization undesirably occurs immediately after the polymer is exposed to an oxidizing atmosphere. If the content exceeds this, the alkyd paint is undesirably cured. The content of BHT can be measured by gas chromatography.

The composition of the present invention may contain another antioxidant in addition to BHT. Examples of the above-described antioxidants include hindered phenol antioxidants, e.g., styrenated phenol, Irganox 1010, and Irganox 245.

The above-described alkyd paint is not specifically limited, and refers to a paint in which a so-called oil-modified alkyd resin prepared by modifying a condensate of a polybasic acid (phthalic anhydride, maleic anhydride, and the like) and a polyhydric alcohol (glycerin, pentaerythritol, ethylene glycol, trimethylolethane, and the like) with a fatty oil or an aliphatic acid (linseed oil, soybean oil, castor oil, safflower oil, and the like) or a modified alkyd resin prepared by modifying an alkyd resin with various resins or vinyl monomers serves as a primary constituent for forming a coating. Any form of the alkyd paint can be used, and examples thereof include alkyd resin varnish, and alkyd resin enamel used for vehicle, aircraft, industrial, and other coatings; alkyd resin-compounded paint (also known as synthetic resin-compounded paint) used for building, railroad bridge, marine, and other coatings; and alkyd resin undercoat paint used as undercoat paint for automobiles, machines, electric appliances, furniture, and the like. In particular, a significant effect is achieved with respect to general-purpose long-oil alkyd paint containing large amounts of drying oil.

In the application of the alkyd paint onto the cured material resulting from the curable composition of the present invention, the application is easily performed in the condition in which the composition is almost completely cured or the composition is in a tack-free state, that is, the surface layer is in a solidified state. However, the alkyd paint can be applied immediately after the composition of the present invention is applied.

The composition of the present invention may further contain a plasticizer, an accelerator, a filler, various additives, and the like.

Examples of plasticizers include phthalates, e.g., dioctyl phthalate, dibutyl phthalate, and butylbenzyl phthalate; aliphatic dibasic acid esters, e.g., dioctyl adipate, isodecyl succinate, and dibutyl sebacate; glycol esters, e.g., diethylene glycol dibenzoate and pentaerythritol esters; aliphatic esters, e.g., butyl oleate and methyl acetyl ricinoleate; phosphates, e.g., tricresyl phosphate, trioctyl phosphate, and octyl diphenyl phosphate; epoxy plasticizers, e.g., epoxidized soybean oil, epoxidized linseed oil, and benzyl epoxy stearate; polyester plasticizers, e.g., polyesters of dibasic acids and dihydric alcohols; polyethers, e.g., polypropylene glycol and derivatives thereof; polystyrenes, e.g., poly-α-methylstyrene and polystyrene; polybutadienes, butadiene-acrylonitrile copolymers, polychloroprenes, polyisoprenes, polybutenes, and chlorinated paraffin. These plasticizers may be used alone or in combination at will.

The usage of the plasticizer is within the range of 0 to 100 parts by weight relative to the amount of the polymer (A) alone or the total amount of the polymer (A) and the polymer (B) in order to yield a preferable result.

In particular, with respect to the improvement in drying property of the alkyd paint, a macromolecular plasticizer may be used in order to yield a preferable result.

The macromolecular plasticizer in the present invention is at least one selected from the group consisting of polyoxypropylenes, polyesters, poly-α-methylstyrenes, polystyrenes, polybutadienes, alkyd resins, polychloroprenes, butadiene-acrylonitrile copolymers, and liquid polycarbonates. The number average molecular weight thereof is 1,000 or more and, more preferably, is 1,500 to 30,000. In general, a plasticizer having high compatibility with the polymer of the present invention is preferable. In particular, an oxypropylene polymer having a number average molecular weight of 1,000 to 30,000 and a molecular weight distribution measured with a gel permeation chromatograph of 1.5 or less is preferable because of a reduced content of low molecular weight polyether components which can readily transfer to the paint. An oxypropylene polymer having substantially no hydroxyl group is preferable, and in particular, an oxyalkylene polymer having an alkenyl group is useful because it is a raw material for the oxyalkylene polymer (A).

Examples of accelerators include organic tin compounds, acid phosphates, reaction products of acid phosphates and amines, saturated or unsaturated polyvalent carboxylic acids or acid anhydrides thereof, and organic titanate compounds. Specific examples of the above-described organic tin compounds include dibutyltin laurate, dioctyltin dimaleate, dibutyltin phthalate, tin octylate, and dibutyltin methoxide. The above-described acid phosphate is disclosed in Japanese Unexamined Patent Application Publication No. 63-112642. Examples of organic titanate compounds include titanates, e.g., tetrabutyl titanate, tetraisopropyl titanate, and triethanolamine titanate.

Preferably, the amount of the accelerator is 0.1 to 20 parts by weight relative to 100 parts by weight of the amount of the polymer (A) alone or the total amount of the polymer (A) and the polymer (B) and, more preferably, is 0.5 to 10 parts by weight.

Examples of fillers include heavy calcium carbonate, light calcium carbonate, colloidal calcium carbonate, kaolin, talc, silica, titanium oxide, aluminum silicate, magnesium oxide, zinc oxide, and carbon black.

Examples of additives include anti-sagging agents, e.g., hydrogenated castor oil, and organic bentonite; colorants, and age resisters.

The resulting composition can be used as adhesives and pressure sensitive adhesives, paint, waterproof materials for coatings, molding materials and casting rubber materials, foaming agents, and the like.

With respect to curing of the composition of the present invention, the polymer (A) alone or the polymer (A) and the polymer (A) are homogeneously mixed with an antioxidant, e.g., BHT, a curing catalyst, and, if necessary, various additives and a filler. The resulting mixture is allowed to stand at room temperature in air, so that curing proceeds and a cured material of the composition of the present invention is prepared.

With respect to application of the alkyd paint to the cured material resulting from the composition of the present invention, the alkyd paint is applied with a brush and the like to the surface of the above-described cured material, and is allowed to stand at room temperature in air, so that curing of the coating proceeds and a dried coating is prepared.

BEST MODE FOR CARRYING OUT THE INVENTION

The present invention will be described below in detail with reference to the examples. However, the present invention is not limited to these examples.

Synthesis Example 1

Propylene oxide was polymerized using polypropylene glycol as an initiator in the presence of a zinc hexacyanocobaltate-glyme complex catalyst to prepare polyoxypropylene glycol having an average molecular weight of 10,000 on a terminal analysis basis and a molecular weight distribution of 1.38 by gel permeation chromatography. At that time, the BHT concentration was very low and was not detected by gas chromatographic analysis because the concentration was lower than the detection limit. Subsequently, the resulting hydroxyl-terminated polyether oligomer was mixed with 500 ppm of BHT and a methanol solution of NaOMe weighing 1.2 equivalent weight relative to the hydroxyl groups. Methanol was distilled off, and 3-chloro-1-propene was added, so that the terminal hydroxyl groups were converted to allyl groups. BHT was consumed during the allylation reaction. The BHT concentration determined by gas chromatographic analysis was 47 ppm. The products of the allylation reaction were dissolved into hexane, and impurities of alkalis, salts, and polymerization metal catalysts were separated therefrom by water extraction. A water layer was removed from the allyl-terminated polyether hexane solution, and BHT was dissolved into the resulting solution at a content of 265 ppm relative to the polymer. The hexane solvent was removed by vaporization and, therefore, a purified allyl polymer was prepared. A platinum complex catalyst and DMS (dimethoxymethylsilane) were added, and a reactive silicon-containing polyoxypropylene polymer (polymer a) was prepared through reaction at 90° for two hours. It was confirmed by $^1$H-NMR analysis that the number average molecular weight of the resulting polymer was about 10,000, and the rate of terminals containing reactive silicon was 82%. The BHT concentration was 310 ppm.

Synthesis Example 2

A solution in which 2.0 g of azobisisobutylonitrile for serving as a polymerization initiator was dissolved in a mixture of 28 g of butyl acrylate, 46 g of methyl methacrylate, 20 g of stearyl methacrylate, 4.4 g of γ-methacryloxypropylmethyldimethoxysilane, and 23 g of toluene was added dropwise over 4 hours into 43 g of toluene heated to 110° C., followed by postpolymerization for 2 hours. The solid content of the resulting copolymer (polymer b) was 60%, and number average molecular weight (Mn) measured with GPC was 8,500 (in terms of polystyrene).

Synthesis Example 3

The reactive silicon-containing polyether oligomer (polymer a) prepared in Synthesis Example 1 and the copolymer (polymer b) prepared in Synthesis example 2 were blended at a ratio of solids (weight ratio) of 70/30, and volatile materials were removed with an evaporator at a heating condition of 110° C. under a vacuum, so that a transparent viscous liquid having a solid content of 99% or more was prepared (polymer c). The BHT concentration determined by gas chromato graphic analysis was 215 ppm.

Synthesis Example 4

A reactive silicon-containing polyoxypropylene polymer (polymer d) was prepared as in Synthesis example 1 except that the amount of addition of BHT after polymerization of propylene oxide was adjusted at 100 ppm, and BHT was not added to the allyl-terminated polyether hexane solution after impurities of alkalis, salts, and polymerization metal catalysts were removed by water extraction. The BHT concentration determined by gas chromatographic analysis was 5 ppm.

Synthesis Example 5

The reactive silicon-containing polyether oligomer (polymer d) prepared in Synthesis example 4 and the copolymer (polymer b) prepared in Synthesis example 2 were blended at a ratio of solids (weight ratio) of 70/30, and volatile materials were removed with an evaporator at a heating condition of 110° C. under a vacuum, so that a transparent viscous liquid having a solid content of 99% or more was prepared (polymer e). The BHT concentration determined by gas chromatographic analysis was 4 ppm.

Comparative Synthesis Example 1

A reactive silicon-containing polyoxypropylene polymer was prepared as in Synthesis example 1 except that BHT was dissolved into the resulting allyl-terminated polyether hexane solution at a content of 500 PPM relative to the polymer. It was confirmed by $^1$H—NMR analysis that the number average molecular weight of the resulting polymer (polymer f) was about 10,000, and the rate of terminals containing reactive silicon groups was 82%. The BHT concentration determined by gas chromatographic analysis was 606 PPM.

Comparative Synthesis Example 2

A blend of the polymer d and the polymer b was prepared as in Synthesis example 3 except that the polymer e was used instead of the polymer a. The BHT concentration determined by gas chromatographic analysis of the resulting blend polymer (polymer g) was 405 PPM.

Examples 1 to 4, and Comparative Examples 1 to 2

Each of curable resin compositions was prepared by homogenously mixing 150 parts by weight of reactive silicon-containing polymer prepared in each of Synthesis example 1, Synthesis example 2, Synthesis example 3, Synthesis example 4, Synthesis example 5, Comparative synthesis example 1, and Comparative synthesis example 2, 130 parts by weight of calcium carbonate, 10 parts by weight of titanium oxide, 3 parts by weight of anti-sagging agent, 3 parts by weight of vinyl trimethoxysilane for serving as a silicon compound, 2 parts by weight of N-(β-aminoethyl)-γ-aminopropyl trimethoxysilane and 1 part by weight of dibutyltin diacetylacetonate. A sheet of this composition of 3 mm in thickness was prepared, and was cured at room temperature for a day. Each of alkyd paint shown in Table 1 was applied with a brush, and the drying states of the paint one day later, three days later, and seven days later were examined by the sense of touch. The drying property of the paint was evaluated as follows:

5: The applied paint was completely cured.

4: The applied paint was cured, but the surface remains tacky.

3: The paint slightly adhered to a finger when the coated surface was touched.

2: A part of the coated surface was cured, but the paint adhered to the finger when the coated surface was touched.

1: The applied paint was thickened.

0: No change was observed with respect to the applied
The results are shown in Table 1.

TABLE 1

|  | Example | | | | Comparative example | |
|---|---|---|---|---|---|---|
|  | 1 | 2 | 3 | 4 | 1 | 2 |
| Polymer (A) | a | — | d | — | f | — |
| Polymer (A) + Polymer (B) | — | c | — | e | — | g |
| BHT content relative to total amount of polymers | 310 | 215 | 5 | 4 | 606 | 405 |
| Rubbol AZ | | | | | | |
| 1 day | 4 | 4 | 5 | 5 | 3–4 | 3–4 |
| 3 days | 5 | 5 | 5 | 5 | 4 | 4 |
| 7 days | 5 | 5 | 5 | 5 | 4 | 4 |
| Wijzonol Glanslak Highsolid | | | | | | |
| 1 day | 2 | 3 | 5 | 5 | 3 | 3 |
| 3 days | 4 | 5 | 5 | 5 | 3 | 3–4 |
| 7 days | 5 | 5 | 5 | 5 | 4 | 4 |
| Evermore | | | | | | |
| 1 day | 4 | 4 | 5 | 5 | 3–4 | 4 |
| 3 days | 5 | 5 | 5 | 5 | 4 | 4 |
| 7 days | 5 | 5 | 5 | 5 | 4 | 4 |
| Premium | | | | | | |
| 1 day | 3 | 3 | 4 | 4 | 3–4 | 3–4 |
| 3 days | 5 | 5 | 5 | 5 | 4 | 4 |
| 7 days | 5 | 5 | 5 | 5 | 4 | 4 |

All of Rubbol AZ: High gloss finish (manufactured by AKZO NOBEL), Wijzonol Glanslak Highsolid: (manufactured by VAN WILHE VERF, Holland), Evermore: Oil/Alkyd•Gloss (The Glidden Company, USA), and Premium: (manufactured by FARF & FLEET, USA), shown in Table 1, are alkyd paint.

Examples 5 to 9, and Comparative Example 3

The drying property of the alkyd paint was evaluated as in Example 1 except that 100 parts by weight of reactive silicon-containing polymer prepared in Synthesis example 4 or Synthesis example 5 was used instead of the reactive silicon-containing polymer prepared in Synthesis example 1, and each of BHT, styrenated phenol, Irganox 1010 (manufactured by Ciba Specialty Chemicals) and Irganox 245 (manufactured by Ciba Specialty Chemicals), was added as an antioxidant at a content (relative to the reactive silicon-containing polymer) shown in Table 2. The results are shown in Table 2.

TABLE 2

|  | Example | | | | | Comparative example |
|---|---|---|---|---|---|---|
|  | 5 | 6 | 7 | 8 | 9 | 3 |
| Polymer (A) | d | — | — | — | — | — |
| Polymer (A) + Polymer (B) | — | e | e | e | e | e |
| Antioxidant (ppm) | | | | | | |
| BHT | 70 | 140 | 210 | 210 | 210 | 410 |
| Styrenated phenol | — | — | 700 | — | — | — |
| Irganox 1010 | — | — | — | 700 | — | — |
| Irganox 245 | — | — | — | — | 700 | — |
| Rubbol AZ | | | | | | |
| 1 day | 5 | 5 | 4 | 4 | 4 | 3–4 |
| 3 days | 5 | 5 | 5 | 5 | 5 | 4 |
| 7 days | 5 | 5 | 5 | 5 | 5 | 4 |
| Wijzonol Glanslak Highsolid | | | | | | |
| 1 day | 4 | 4 | 3 | 4 | 3 | 2 |
| 3 days | 5 | 5 | 5 | 5 | 5 | 3–4 |
| 7 days | 5 | 5 | 5 | 5 | 5 | 4 |
| Evermore | | | | | | |
| 1 day | 5 | 5 | 4 | 5 | 5 | 3–4 |
| 3 days | 5 | 5 | 5 | 5 | 5 | 4 |
| 7 days | 5 | 5 | 5 | 5 | 5 | 5 |
| Premium | | | | | | |
| 1 day | 4 | 4 | 3 | 4 | 4 | 3 |
| 3 days | 5 | 5 | 5 | 4 | 4 | 4 |
| 7 days | 5 | 5 | 5 | 5 | 5 | 4 |

INDUSTRIAL APPLICABILITY

According to the polymer composition of the present invention, the drying property of the paint is improved in application of the alkyd paint.

The invention claimed is:

1. A composition comprising an oxyalkylene polymer (A) having at least one silicon-containing functional group capable of cross-linking by formation of at least one siloxane bond and 2,6-di-t-butylhydroxytoluene,
   wherein the content of 2,6-di-t-butylhydroxytoluene is controlled to be 1–31 ppm relative to the polymer (A) after the silicon-containing functional group is introduced therein.

2. A coating method comprising the step of applying alkyd paint to a surface of a cured material resulting from the composition according to claim 1.

3. A composition according to claim 1, which further comprises another antioxidant in addition to 2,6-di-t-butylhydroxytoluene.

4. A composition according to claim 1, which further comprises macromolecular plasticizer, wherein the content of 2,6-di-t-butylhydroxytoluene is controlled to be 1–31 ppm relative to the total amount of said polymer (A) and said plasticizer.

5. A composition comprising an oxyalkylene polymer (A) having at least one silicon-containing functional group capable of cross-linking by formation of at least one siloxane bond, a polymer (B) comprising a molecular chain composed of (meth)acrylate monomer units and comprising at least one silicon-containing functional group capable of cross-linking by formation of at least one siloxane bond, and 2,6-di-t-butylhydroxytoluene, wherein the content of 2,6-di-t-butylhydroxytoluene is controlled to be 1–31 ppm relative to the total amount of the polymer (A) and the polymer (B) after the silicon-containing functional group is introduced therein.

6. A coating method comprising the step of applying alkyd paint to a surface of a cured material resulting from the composition according to claim 5.

7. A composition according to claim 5, which further comprises another antioxidant in addition to 2,6-di-t-butylhydroxytoluene.

8. A composition according to claim 5, which further comprises macromolecular plasticizer, wherein the content of 2,6-di-t-butylhydroxytoluene is controlled to be 1–31 ppm relative to the total amount of said polymer (A), said polymer (B), and said plasticizer.

9. A method for improving a drying property of alkyd paint in application of the alkyd paint to a surface of a cured material resulting from a composition comprising an oxyalkylene polymer (A) having at least one silicon-containing functional group capable of cross-linking by formation of at least one siloxane bond and 2,6-di-t-butylhydroxytoluene, the method comprising the step of:

adjusting the content of 2,6-di-t-butylhydroxytoluene to be controlled at 1–31 ppm relative to the polymer (A) after the silicon-containing functional group is introduced therein.

10. A method for improving a drying property of alkyd paint in application of the alkyd paint to the surface of a cured material resulting from a composition comprising an oxyalkylene polymer (A) having at least one silicon-containing functional group capable of cross-linking by formation of at least one siloxane bond, a polymer (B) comprising a molecular chain composed of (meth)acrylate monomer units and comprising silicon-containing functional groups capable of cross-linking by formation of siloxane bonds, and 2,6-di-t-butylhydroxytoluene, the method comprising the step of:

adjusting the content of 2,6-di-t-butylhydroxytoluene to be controlled at 1–31 ppm relative to the total amount of the polymer (A) and the polymer (B) after the silicon-containing functional group is introduced therein.

\* \* \* \* \*

UNITED STATES PATENT AND TRADEMARK OFFICE
CERTIFICATE OF CORRECTION

PATENT NO. : 7,151,128 B2  Page 1 of 1
APPLICATION NO. : 10/478324
DATED : December 19, 2006
INVENTOR(S) : Toyohisa Fujimoto et al.

It is certified that error appears in the above-identified patent and that said Letters Patent is hereby corrected as shown below:

In Claim 1
Line 6, change "1-31" to --1-310--.

In Claim 4
Line 3, change "1-31" to --1-310--.

In Claim 5
Line 10, change "1-31" to --1-310--.

In Claim 8
Line 3, change "1-31" to --1-310--.

In Claim 9
Line 9, change "1-31" to --1-310--.

In Claim 10
Line 13, change "1-31" to --1-310--.

Signed and Sealed this

Twentieth Day of March, 2007

JON W. DUDAS
*Director of the United States Patent and Trademark Office*